(12) United States Patent  
Khamis et al.

(10) Patent No.: US 12,420,839 B2  
(45) Date of Patent: Sep. 23, 2025

(54) VULNERABLE ROAD USER'S ADVERSARIAL BEHAVIOR OPPORTUNITY AND CAPABILITY

(71) Applicant: GM Global Technology Operations LLC, Detroit, MI (US)

(72) Inventors: Alaa M. Khamis, Courtice (CA); Wei Tong, Troy, MI (US); Upali P. Mudalige, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 281 days.

(21) Appl. No.: 18/319,026

(22) Filed: May 17, 2023

(65) Prior Publication Data

US 2024/0383503 A1 Nov. 21, 2024

(51) Int. Cl.
| | |
|---|---|
| *B60W 60/00* | (2020.01) |
| *B60Q 9/00* | (2006.01) |
| *B60W 40/02* | (2006.01) |
| *G06V 20/58* | (2022.01) |
| *G06V 20/64* | (2022.01) |

(52) U.S. Cl.
CPC ........... *B60W 60/0016* (2020.02); *B60Q 9/00* (2013.01); *B60W 40/02* (2013.01); *G06V 20/58* (2022.01); *G06V 20/64* (2022.01); *B60W 2420/403* (2013.01); *B60W 2554/4029* (2020.02); *B60W 2554/4046* (2020.02); *B60W 2556/45* (2020.02)

(58) Field of Classification Search
CPC ............ B60W 60/0016; B60W 40/02; B60W 2554/4029; B60W 2556/45; B60W 2554/4046; B60W 2420/403; G06V 20/58; G06V 20/64; B60Q 9/00
See application file for complete search history.

(56) References Cited

U.S. PATENT DOCUMENTS

| | | | |
|---|---|---|---|
| 2013/0342333 A1* | 12/2013 | Hutchings | G08B 13/19647 348/148 |
| 2019/0212740 A1* | 7/2019 | Matsui | G08G 1/123 |
| 2020/0398743 A1* | 12/2020 | Huber | B60W 30/0956 |
| 2021/0020042 A1 | 1/2021 | Arndt et al. | |
| 2021/0354730 A1 | 11/2021 | Anthony et al. | |
| 2022/0097694 A1 | 3/2022 | Edo Ros | |
| 2023/0316907 A1* | 10/2023 | Ramamurthy | G08G 1/0969 |
| 2025/0029468 A1* | 1/2025 | Liu | B60R 25/1004 |

* cited by examiner

*Primary Examiner* — Naeem Taslim Alam  
(74) *Attorney, Agent, or Firm* — Vivacqua Crane, PLLC

(57) ABSTRACT

A system for determining opportunity and capability for identified adversarial behavior within an autonomous vehicle, comprising a pedestrian detection system, a vehicle controller and an adversarial intent algorithm adapted to determine a risk level of adversarial behavior from at least one pedestrian within proximity of the autonomous vehicle, and, when the adversarial intent algorithm determines that there is a risk of adversarial behavior, to determine a risk level of the adversarial behavior based on opportunity and capability.

20 Claims, 9 Drawing Sheets

VULNERABLE ROAD USER'S ADVERSARIAL BEHAVIOR OPPORTUNITY AND CAPABILITY

INTRODUCTION

The present disclosure relates to recognizing adversarial behavior on the part of vulnerable road users in proximity to an automated driving vehicle. With the introduction of autonomous vehicles, adversarial behaviors by pedestrians and other vulnerable road users toward autonomous vehicles is becoming an issue, particularly in urban environments. Adversarial behaviors, often in the form of bullying, come from both pedestrians and other road users. Adversarial behavior can take the form of rude gestures and utterances, challenging the autonomous vehicle to brake, driving up close behind an autonomous vehicle, and tending not to give an autonomous vehicle the right of way at intersections and crossings.

Thus, while current systems and methods achieve their intended purpose, there is a need for an improved system and method for automatically detecting adversarial behavior directed toward an autonomous vehicle.

SUMMARY

According to several aspects of the present disclosure, a method of determining opportunity and capability for identified adversarial behavior within an autonomous vehicle includes determining, with a pedestrian detection system, a vehicle controller and an adversarial intent algorithm a risk level of adversarial behavior from at least one pedestrian within proximity of the autonomous vehicle, and when the adversarial intent algorithm determines that there is a risk of adversarial behavior, determining a risk level of the adversarial behavior based on opportunity and capability.

According to another aspect, the determining a risk level of the adversarial behavior based on opportunity and capability includes initiating, with the vehicle controller, an opportunity algorithm adapted to determine one of: a positive opportunity of adversarial behavior and a negative opportunity of adversarial behavior.

According to another aspect, the initiating, with the vehicle controller, the opportunity algorithm includes determining one of a positive opportunity of adversarial behavior and a negative opportunity of adversarial behavior based on contextual information including at least one of: a time of day, historical data related to how safe a location where the autonomous vehicle is located is, how crowded a cross-walk is, weather conditions and how well the location where the autonomous vehicle is located is illuminated.

According to another aspect, if the opportunity algorithm indicates a negative opportunity of adversarial behavior, the method includes determining, with the vehicle controller, a low risk of adversarial behavior and continuing to run, with the vehicle controller, the opportunity algorithm.

According to another aspect, if the opportunity algorithm indicates a positive opportunity of adversarial behavior, the method includes initiating, with the vehicle controller, a capability algorithm adapted to determine one of: a positive capability of adversarial behavior and a negative capability of adversarial behavior.

According to another aspect, the initiating, with the vehicle controller, the capability algorithm further includes initiating a threatening object detection algorithm.

According to another aspect, if the capability algorithm indicates a negative capability of adversarial behavior, the method includes determining, with the vehicle controller, a low risk of adversarial behavior and continuing to run, with the vehicle controller, the capability algorithm.

According to another aspect, if the opportunity algorithm indicates a positive opportunity of adversarial behavior, and, if the capability algorithm indicates a positive capability of adversarial behavior, the method includes determining, with the vehicle controller, a high risk of adversarial behavior.

According to another aspect, the determining, with the vehicle controller, a low risk of adversarial behavior further includes generating, with the vehicle controller, visual and auditory warning cues for the pedestrian.

According to another aspect, the determining, with the vehicle controller, a high risk of adversarial behavior further includes generating, with the vehicle controller, reports with information related to the adversarial behavior and sending reports with information related to the adversarial behavior to remotely located entities.

According to several aspects of the present disclosure, a system for determining opportunity and capability for identified adversarial behavior within an autonomous vehicle, comprising a pedestrian detection system, a vehicle controller and an adversarial intent algorithm adapted to determine a risk level of adversarial behavior from at least one pedestrian within proximity of the autonomous vehicle, and, when the adversarial intent algorithm determines that there is a risk of adversarial behavior, to determine a risk level of the adversarial behavior based on opportunity and capability.

According to another aspect, when determining a risk level of the adversarial behavior based on opportunity and capability, the vehicle controller is further adapted to initiate an opportunity algorithm adapted to determine one of: a positive opportunity of adversarial behavior and a negative opportunity of adversarial behavior.

According to another aspect, when initiating the opportunity algorithm, the vehicle controller is further adapted to determine one of a positive opportunity of adversarial behavior and a negative opportunity of adversarial behavior based on a time of day, historical data related to how safe a location where the autonomous vehicle is located is, and how well the location where the autonomous vehicle is located is illuminated.

According to another aspect, if the opportunity algorithm indicates a negative opportunity of adversarial behavior, the vehicle controller is further adapted to determine a low risk of adversarial behavior and to continue running the opportunity algorithm.

According to another aspect, if the opportunity algorithm indicates a positive opportunity of adversarial behavior, the vehicle controller is further adapted to initiate a capability algorithm adapted to determine one of: a positive capability of adversarial behavior and a negative capability of adversarial behavior.

According to another aspect, when initiating the capability algorithm, the vehicle controller is further adapted to initiate a threatening object detection algorithm.

According to another aspect, if the capability algorithm indicates a negative capability of adversarial behavior, the vehicle controller is further adapted to determine a low risk of adversarial behavior and to continue running the capability algorithm.

According to another aspect, if the opportunity algorithm indicates a positive opportunity of adversarial behavior, and, if the capability algorithm indicates a positive capability of adversarial behavior, the vehicle controller is adapted to determine a high risk of adversarial behavior.

According to another aspect, when the vehicle controller determines a low risk of adversarial behavior, the vehicle controller is further adapted to cause the autonomous vehicle to generate visual and auditory warning cues for the pedestrian, and, when the vehicle controller determines a high risk of adversarial behavior, the vehicle controller is further adapted to generate reports with information related to the adversarial behavior and send the reports with information related to the adversarial behavior to remotely located entities.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
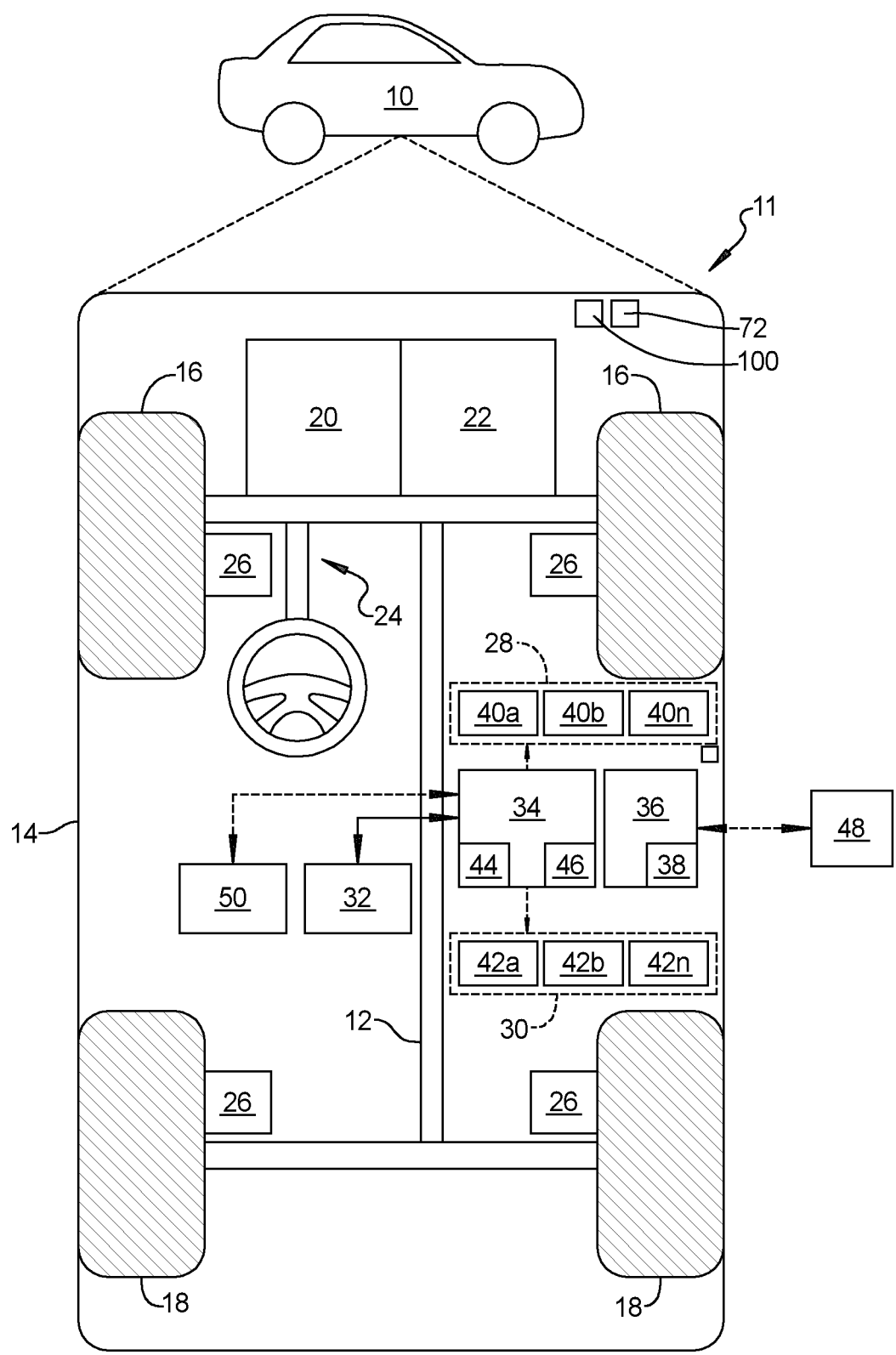
FIG. 1 is a schematic diagram of an autonomous vehicle including a system according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated system 11 for automatically detecting adversarial behavior directed toward an automated driving vehicle. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an automated driving vehicle and the system 11 is incorporated into the automated driving vehicle 10 (hereinafter referred to as the autonomous vehicle 10). The autonomous vehicle 10 is, for example, a vehicle that is automatically controlled to carry passengers from one location to another, or to perform tasks with no passengers present. The autonomous vehicle 10 is depicted in the illustrated embodiment as a passenger car, but it should be appreciated that any other vehicle including motorcycles, trucks, sport utility vehicles (SUVs), recreational vehicles (RVs), self-driving shuttles (SDSs), etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, a vehicle controller 34, and a communication system 36. In an embodiment in which the autonomous vehicle 10 is an electric vehicle, there may be no transmission system 22.

The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic; transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more external sensors 40a-40n that sense observable conditions of the exterior environment and/or the interior environment of the autonomous vehicle 10. The external sensors 40a-40n can include, but are not limited to, radars, lidars, global positioning systems, optical cameras, thermal cameras, ultrasonic sensors, and/or other sensors. The external sensors 40a-40n are adapted to collect data relative to an environment surrounding the autonomous vehicle 10 as well as pedestrians and objects within proximity of the autonomous vehicle 10. The cameras can include two or more digital cameras spaced at a selected distance from each other, in which the two or more digital cameras are used to obtain stereoscopic images of the surrounding environment in order to obtain a three-dimensional image. The sensing devices 40a-40n can include sensors that monitor dynamic variables of the vehicle 10, such as its velocity, its acceleration, a number of times that the brake is applied, etc. The actuator system 30 includes one or more actuator devices 42a-42n that control one or more vehicle features such as, but not limited to, the propulsion system 20, the transmission system 22, the steering system 24, and the brake system 26.

The vehicle controller 34 includes at least one processor 44 and a computer readable storage device or media 46. The at least one processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller is shown in FIG. 1, embodiments of the autonomous vehicle 10 can include any number of controllers that communicate over any suitable communication medium or a combination of communication mediums and that cooperate to process the sensor signals, perform logic, calculations, methods, and/or algorithms, and generate control signals to automatically control features of the autonomous vehicle 10.

The communication system 36 includes a wireless communication module 38 that is configured to wirelessly communicate information and data to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication such as Cellular Vehicle to Anything (C-V2X) communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
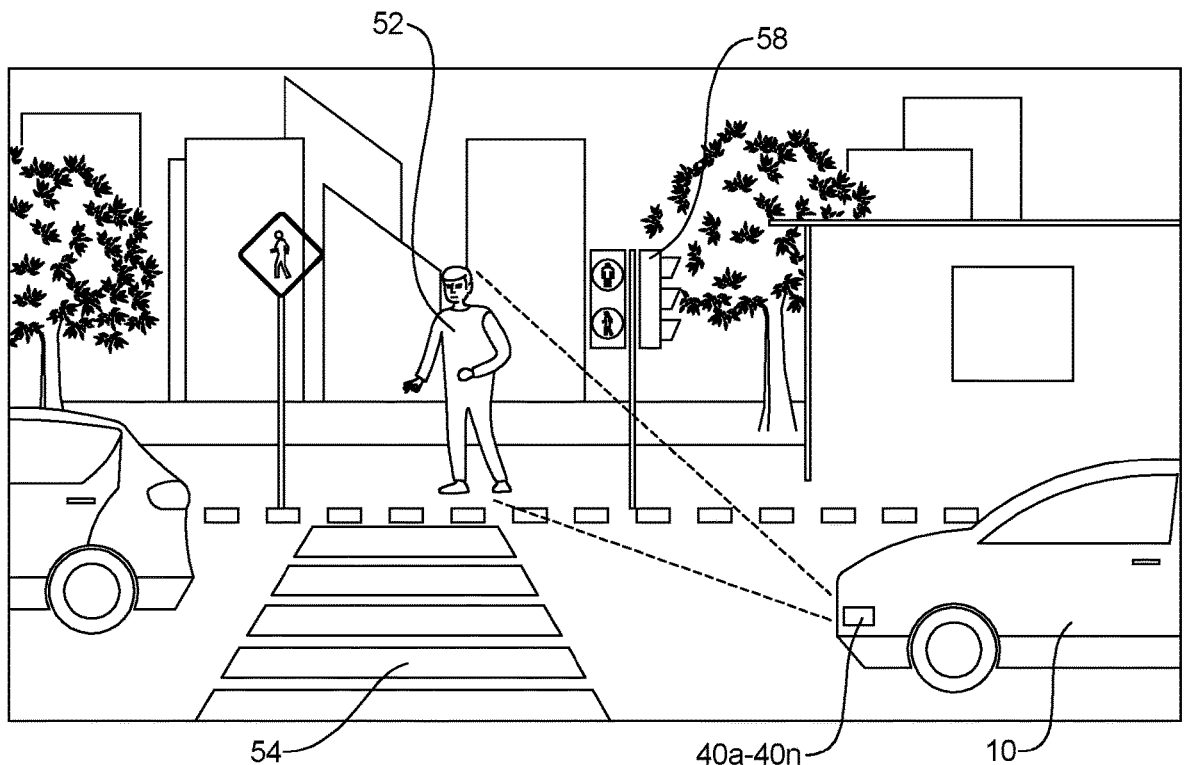
FIG. 2 is a perspective view of an autonomous vehicle approaching a cross-walk where a pedestrian is preparing to cross.

A pedestrian detection system 50 is in communication with the vehicle controller 34. The pedestrian detection system 50 is adapted to identify a pedestrian 52 within proximity of the autonomous vehicle 10. It should be understood that the pedestrian detection system 50 is adapted to detect any objects within proximity to the autonomous vehicle 10. The term "pedestrian", as used herein, includes walking pedestrians, cyclists, or other vulnerable road users. Referring to FIG. 2, the pedestrian detection system 50 uses information collected by at least one of the external sensors 40a-40n to identify the pedestrian 52 that is standing along side the roadway at a cross-walk 54 in front of the autonomous vehicle 10.

The pedestrian detection system 50, using data that is continuously collected by the external sensors 40a-40n and/or other vehicles' perception system and/or sensors available as part of intelligent infrastructure such as smart intersections, is adapted to track the pedestrian 52 and to determine if the pedestrian 52 is intending to cross in front of the autonomous vehicle 10. The pedestrian detection system 50 makes this determination based on the location and movement of the pedestrian 52. Various methods to identify, track and determine the pedestrian's 52 intention to cross in front of the autonomous vehicle 10 are known. It should be understood that the pedestrian detection system 50 of the present disclosure may utilize any suitable method or algorithm for identification, tracking and determination of a pedestrian's 52 intention to cross in front of the autonomous vehicle 10.

If the pedestrian tracking system 50 determines that the pedestrian 52 is not intending to cross in front of the autonomous vehicle 10, the pedestrian tracking system 50 is further adapted to continue tracking the pedestrian 52. If the pedestrian tracking system 50 determines that the pedestrian 52 is intending to cross in front of the autonomous vehicle 10, the pedestrian tracking system 50 is further adapted to determine, with an adversarial intent algorithm 56, if the pedestrian 52 is exhibiting any adversarial behavior.

In an exemplary embodiment, when the pedestrian tracking system 50 determines that the pedestrian 52 is intending to cross in front of the autonomous vehicle 10, the pedestrian tracking system 50 is further adapted to determine, with the vehicle controller 34, if the autonomous vehicle 10 has right of way. The autonomous vehicle 10 has the right of way when, based on the type of crossing 54 and any signs, lights or other signals 58 present, the autonomous vehicle 10 is allowed to proceed and pedestrians 52 should wait to cross. When determining if the autonomous vehicle 10 has a right of way, the vehicle controller 34 is further adapted to determine what type of crossing 54 is present in front of the autonomous vehicle 10, to be used by the pedestrian 52, to identify crossing signals 58 for the identified crossing type, and to determine if the autonomous vehicle 10 has the right of way based on the identified crossing signals 58. If the autonomous vehicle 10 does not have the right of way, the pedestrian tracking system 50 is further adapted to continue tracking the pedestrian 52. If the autonomous vehicle 10 does have the right of way, the pedestrian tracking system 50 is further adapted to determine, with the adversarial intent algorithm 56, if the pedestrian 52 is exhibiting any adversarial behavior.

Figure 3:
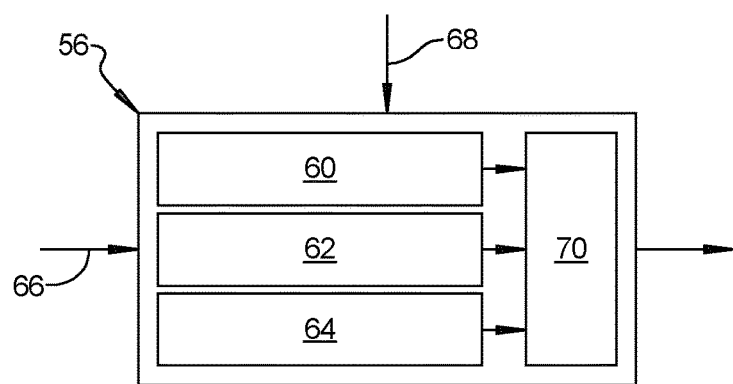
FIG. 3 is a schematic view of an adversarial intent algorithm according to an exemplary embodiment.

Referring to FIG. 3, in an exemplary embodiment, the adversarial intent algorithm 56 is adapted to determine if the pedestrian 52 is exhibiting any adversarial behavior based on at least one of crossing behavior of the pedestrian 52, non-verbal cues from the pedestrian 52 and audible cues. The adversarial intent algorithm 56 includes a crossing behavior algorithm 60, a non-verbal cue algorithm 62, and an audible cue algorithm 64. The crossing behavior algorithm 60 determines if the pedestrian 52 is exhibiting adversarial behavior based on the crossing behavior of the pedestrian 52. The non-verbal cue algorithm 62 determines if the pedestrian 52 is exhibiting adversarial behavior based on non-verbal cues of the pedestrian 52. The audible cue algorithm 64 determines if the pedestrian 52 is exhibiting adversarial behavior based on audible cues detected by a microphone included among the external sensors 40a-40n of the autonomous vehicle 10.

The adversarial intent algorithm 56 receives input from the pedestrian detection system 50, as indicated by arrow 66, and input from the external sensors 40a-40n via the vehicle controller 34, as indicated by arrow 68. An information fusion algorithm 70 is adapted to combine information related to the crossing behavior of the pedestrian 52, received from the crossing behavior algorithm 60, information related to non-verbal cues from the pedestrian 52, received from the non-verbal cue algorithm 62, and information related to audible cues, received from the audible cues algorithm 64 to identify adversarial behavior.

In an exemplary embodiment, when determining, with the adversarial intent algorithm 56, if the pedestrian 52 is exhibiting any adversarial behavior based on the crossing behavior of the pedestrian 52, the vehicle controller 34, using the crossing behavior algorithm 60, is further adapted to calculate an estimated crossing time for the pedestrian 52 to cross in front of the autonomous vehicle 10. The adversarial intent algorithm 56 is further adapted to determine that the pedestrian 52 is not exhibiting any adversarial behavior when the pedestrian 52 finishes crossing in front of the autonomous vehicle 10 within a predetermined time window, and to determine that the pedestrian 52 is exhibiting adversarial behavior when the pedestrian 52 does not finish crossing in front of the autonomous vehicle 10 within the predetermined time window.

In an exemplary embodiment, the crossing behavior algorithm uses a Simple Online and Realtime Tracking (SORT) tracking algorithm to estimate a motion model for the pedestrian 52 using an intersection-over-union distance. An expected crossing time is calculated using information such as the location of the autonomous vehicle and features of the cross-walk 54. The pre-determined time window is calculated based on an estimated crossing time, the formula for which may be tuned, wherein a shorter pre-determined time window is more sensitive and will provide an indication of adversarial behavior more often than a less-sensitive, longer pre-determined time window.

Figure 4:
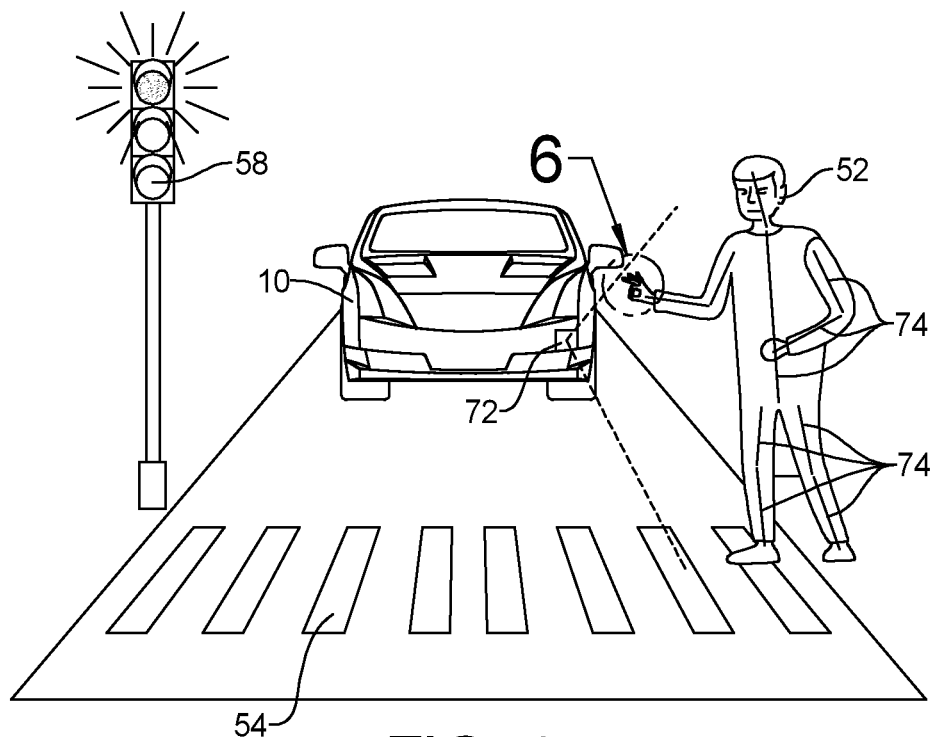
FIG. 4 is a perspective view of a cross walk, wherein a pedestrian is crossing in front of an autonomous vehicle.

In an exemplary embodiment, when determining, with the non-verbal cue algorithm 62 of the adversarial intent algorithm 56, if the pedestrian 52 is exhibiting any adversarial behavior based on non-verbal cues from the pedestrian 52, the pedestrian tracking system 50 is adapted to identify physical properties of the pedestrian 52. Referring to FIG. 4, the pedestrian detection system 50 is adapted to identify all pedestrians 52 within proximity to the autonomous vehicle 10. As shown, the pedestrian detection system 50 has identified one pedestrian 52 walking through the cross-walk 54 in front of the autonomous vehicle 10. At least one of the external sensors 40a-40n of the autonomous vehicle 10 is a camera 72 adapted to capture images of the pedestrian 52 in front of the autonomous vehicle 10.

The pedestrian detection system 50, using the non-verbal cue algorithm 62, is adapted to identify, at 76, for each pedestrian 52, physical properties and generate a profile for each pedestrian 52. Physical properties include the location of the pedestrian 52, body actions, such as is the pedestrian 52 walking, running, crawling, lying down, laughing, crying, reading, pushing, pulling, etc. The pedestrian detection system 50 further identifies physical properties such as the location and dynamics of the legs, arms and head of the pedestrian 52. Referring to FIG. 4, two-dimensional and three-dimensional skeletal location and dynamics of the pedestrian 52 are located and tracked as indicated by vector representations 74 of various skeletal features of the pedestrian 52. The pedestrian detection system 50 further tracks movement dynamics of the pedestrian 52, such as direction, speed and acceleration, as well as duration of any actions (how long has the pedestrian 52 been doing that?).

The vehicle controller 34, at 78, is adapted to analyze spatiotemporal characteristics of the physical properties of the pedestrian 52. For each of the pedestrians 52, in different zones, the system 11 estimates the following: number of pedestrians 52, distribution of actions, dynamics and durations, maximum and minimum values of dynamics and durations, and mean and standard deviation of dynamics and durations. A critical zone is defined as the overlapping area between a field of view of the camera 72 and a predicted path of the pedestrian 52. For each pedestrian within the critical zone, at 80, the system 11 is adapted to check if the profile generated for the pedestrian 52 should be categorized as "suspicious", indicating adversarial behavior.

The non-verbal cue algorithm 62 and the vehicle controller 34 are adapted to determine if any physical properties of the pedestrian 52 indicate adversarial behavior by the pedestrian 52. The system 11 is adapted to compare the physical properties of the pedestrian 52 to "normal" patterns which are obtained from a remote database 82 of known patterns which indicate adversarial behavior, or from a neural network stored within the system 11 that uses machine learning to compile a set of know patterns that indicate adversarial behavior. In addition to comparing current patterns to known patterns, other characteristics are used to determine if the movements and actions of a pedestrian 52 should be interpreted as adversarial behavior. For instance, in a crowd of people, if an individual pedestrian 52 exhibits a gesture or action, it may be interpreted by the system 11 as adversarial behavior. However, if multiple pedestrians 52 within a group are exhibiting the same gesture or action there is a higher likelihood of adversarial behavior. Time is always a significant factor. The longer an action or activity persists, the higher a likelihood that such action or activity constitutes adversarial behavior. Similarly, distance from the autonomous vehicle 10 is a significant consideration. The farther away from the autonomous vehicle 10 a pedestrian 52 is, the less likely it is that any behavior on the part of the pedestrian 52 is adversarial. If the vehicle controller 34 determines that the physical properties of the pedestrian 52 do not indicated adversarial behavior on the part of the pedestrian 52, then, as indicated by line 81, the vehicle controller 34, at 78, is adapted to continue to analyze spatiotemporal characteristics of the physical properties of the pedestrian 52 that are continuously collected.

If the vehicle controller 34, at 80, determines that the physical properties of the pedestrian 52 do not indicate adversarial behavior on the part of the pedestrian 52, then, as indicated by line 81, the vehicle controller 34, at 78, is adapted to continue to analyze spatiotemporal characteristics of the physical properties of the pedestrian 52 that are continuously collected. If the vehicle controller 34, at 80, determines that the physical properties of the pedestrian 52 do indicate adversarial behavior on the part of the pedestrian 52, then, as indicated by line 83, the non-verbal cue algorithm 62 is adapted to indicate that there is adversarial behavior to the adversarial intent algorithm 56.

Figure 6:
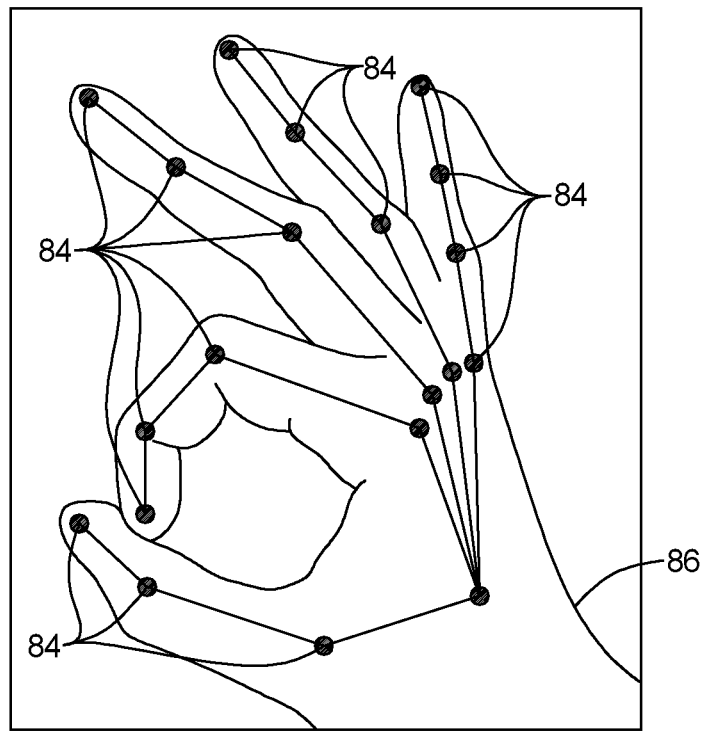
FIG. 6 is a schematic view wherein the non-verbal cue algorithm has identified key points of a hand of a pedestrian.
Figure 7:
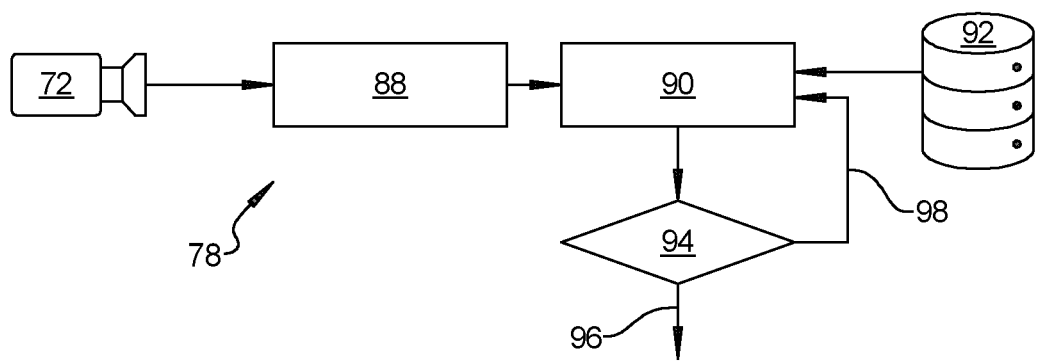
FIG. 7 is a schematic view of an audible cue algorithm according to an exemplary embodiment.

Referring to FIG. 6 and FIG. 7, in another exemplary embodiment of the present disclosure, when analyzing, with the vehicle controller 34, spatiotemporal characteristics of the physical properties of the pedestrian 52, at 78, the pedestrian tracking system 50 is further adapted, at 88, to identify key points 84 of a hand 86 of the pedestrian 52. Referring to FIG. 6, in an enlarged view of the hand 86 of the pedestrian 52 from FIG. 4, key points 84 (as shown, joint locations within the hand and fingers) of the hand 86 of the pedestrian 52 are highlighted and linked, to allow the vehicle controller 34 to determine a shape or gesture that the hand 86 is displaying. The system 11 may use, by way on non-limiting examples, mesh model matching, depth-based methods, deep learning-based post estimation methods, such as Open Pose or Deep Pose, or multi-view bootstrapping when creating a key-point model of the hand 86.

The vehicle controller 34, at 90, is further adapted to compare identified key points 84 of the hand 86 of the pedestrian 52 to a remote database 92 of known threatening gestures. Alternatively, the vehicle controller 34 may compare the identified key points 84 of the hand 86 of the pedestrian 52 to known threatening gestures stored within a neural network stored within the system 11 that uses machine learning to compile a set of know threatening gestures. At 94, if the non-verbal cue algorithm 62 determines that the identified key points 84 of the hand 86 of the pedestrian match at least one of the known threatening gestures stored within the database 92, then the non-verbal cue algorithm 62 is adapted to indicate to the adversarial intent algorithm 56 that the pedestrian 52 is exhibiting adversarial behavior, as indicated by line 96. The adversarial intent algorithm 56 is adapted to determine that the pedestrian 52 is exhibiting adversarial behavior when the identified key points 84 of the hand 86 of the pedestrian 52 match at least one of the known threatening gestures within the remote database 92. If the non-verbal cue algorithm 62 determines that the identified key points 84 of the hand 86 of the pedestrian do not match at least one of the known threatening gestures stored within the database 92, then the non-verbal cue algorithm 62 is adapted to, at 90, continue to compare identified key points 84 of the hand 86 of the pedestrian 52 to a remote database 92 of known threatening gestures, as indicated by line 98.

In another exemplary embodiment, when determining, with the adversarial intent algorithm 56, if the pedestrian 52 is exhibiting any adversarial behavior based on audible cues, the vehicle controller 34 is further adapted to extract features of acoustic signals captured with one of the external sensors 40a-40n which is an external microphone 100, and compare features of the acoustic signals to a remote database 102 which includes an optimized model 104 of known sounds that indicate adversarial behavior. The adversarial intent algorithm 56 is further adapted to determine that the pedestrian 52 is exhibiting adversarial behavior when the captured acoustic signals match known sounds from the optimized model 104 of the acoustic cue algorithm that indicate adversarial behavior. Speech and non-speech sounds that are indicative of adversarial behavior includes, but are not limited to, shouting, hit/hitting with a stick sound, impact or crash sounds, cursing, insulting words, threatening words, and bullying and sarcastic sounds such as laugh/derisive deep male voice.

Figure 8:
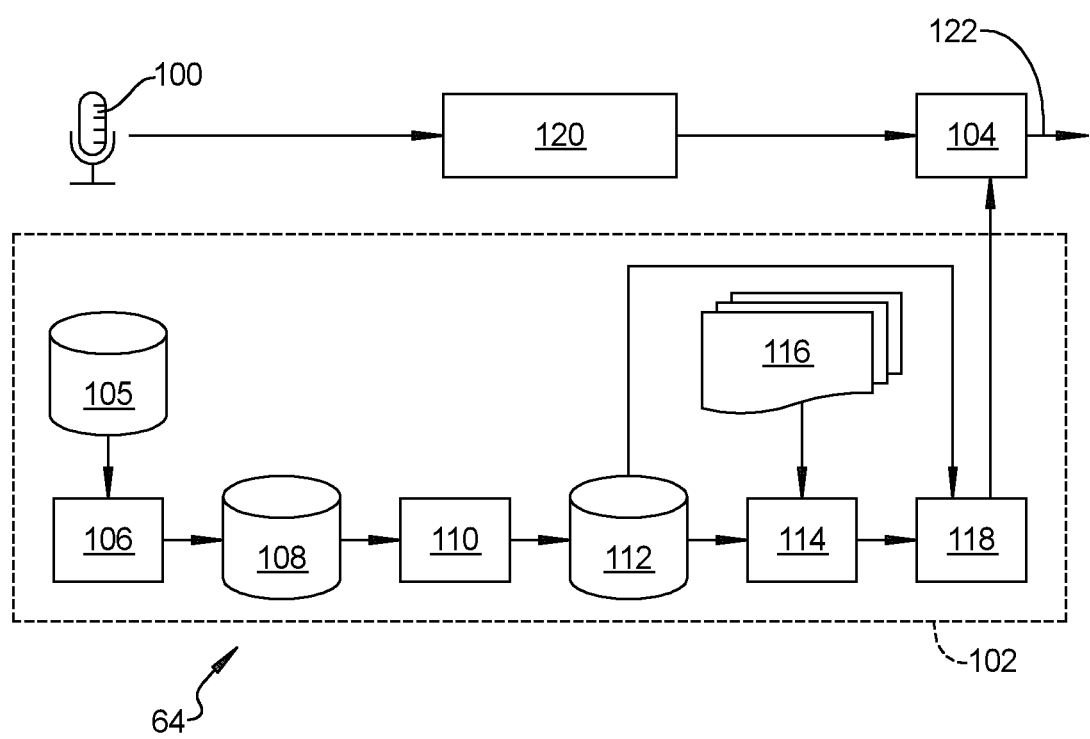
FIG. 8 is a schematic view illustrating how a remote database creates an optimized model of threatening acoustic signals.

Referring to FIG. 8, the optimized model 104 is created and updated within the remote database 102. Beginning with a non-speech audio event dataset 105 including data collected, augmented and grouped considering different noise factors such as season, weather conditions, locations, background noise and reverberations, vehicle speed, etc. The data of the non-speech audio event dataset 105 is processed, at 106, to create a pre-processed non-speech audio event dataset 108. At 110, discriminative features of the pre-processed non-speech audio event dataset 108 are identified and fed to a training and testing dataset 112 wherein model training/testing takes place at 114, using machine learning algorithms 116 to optimize a candidate model 118, creating the optimized model 104 of recognized threatening audible cues.

In an exemplary embodiment, acoustic signals are captured by the microphone 100, and then, at 120, the audible cue algorithm 64 extracts features of the acoustic signals, such as, but not limited to, Mel-frequency cepstral coefficients (MFCC), Filterbank Energies, Log Filterbank Energies and Spectral Sub-band Centroids. When such features match features within the optimized model of known threatening sounds, the audible cue algorithm 64, as indicated by line 122, communicates this information to the adversarial intent algorithm 56, which is further adapted to determine that the pedestrian 52 is exhibiting adversarial behavior when the captured acoustic signals match known sounds from the optimized model 104 of the acoustic cue algorithm 64 that indicate adversarial behavior.

As previously mentioned, the information fusion algorithm 70 is adapted to combine information related to the crossing behavior of the pedestrian 52, received from the crossing behavior algorithm 60, information related to non-verbal cues from the pedestrian 52, received from the non-verbal cue algorithm 62, and information related to audible cues, received from the audible cues algorithm 64 to identify adversarial behavior.

In an exemplary embodiment, the information fusion algorithm 70 is adapted to provide a two-level indication of adversarial behavior, wherein, based on the output from the crossing behavior algorithm 60, the non-verbal cue algorithm 62, and the audible cues algorithm 64, the information fusion algorithm provides a binary answer, in that, there either is adversarial behavior on the part of the pedestrian 52, or there is not adversarial behavior on the part of the pedestrian 52.

TABLE A below includes a summary of the possible outcomes from the information fusion algorithm 70. The first column represents the crossing behavior algorithm 60, wherein "no" indicates that the crossing behavior algorithm 60 did not determine that the crossing behavior of the pedestrian indicates adversarial behavior on the part of the pedestrian 52, and "yes" indicates that the crossing behavior algorithm 60 did determine that the crossing behavior of the pedestrian 52 indicates adversarial behavior on the part of the pedestrian 52. The second column represents the non-verbal cue algorithm 62, wherein "no" indicates that the non-verbal cue algorithm 62 did not determine that the non-verbal cues by the pedestrian 52 indicate adversarial behavior on the part of the pedestrian 52, and "yes" indicates that the non-verbal cue algorithm 62 did determine that the non-verbal cues by the pedestrian 52 indicate adversarial behavior on the part of the pedestrian 52. The third column represents the audible cue algorithm 64, wherein "no" indicates that the audible cue algorithm 64 did not detect acoustic signals that indicate adversarial behavior, and "yes" indicates that the audible cue algorithm 64 did detect acoustic signals that indicate adversarial behavior. The fourth column is the result provided by the adversarial intent algorithm 56.

TABLE A

| Crossing Behavior | Non-Verbal Cue | Audible Cue | Adversarial Behavior? |
|---|---|---|---|
| No | No | No | No |
| No | No | Yes | Yes |
| No | Yes | No | Yes |
| No | Yes | Yes | Yes |
| Yes | No | No | Yes |
| Yes | No | Yes | Yes |
| Yes | Yes | No | Yes |
| Yes | Yes | Yes | Yes |

As, shown, for the two-level indication of adversarial behavior, the adversarial intent algorithm 56 will indicate that there is adversarial behavior whenever any one or more of the crossing behavior algorithm 60, the non-verbal cue algorithm 62, and the audible cues algorithm 64 indicate that there is adversarial behavior.

In another exemplary embodiment, the information fusion algorithm 70 is adapted to provide a three-level indication of adversarial behavior, wherein, based on the output from the crossing behavior algorithm 60, the non-verbal cue algorithm 62, and the audible cues algorithm 64, the information fusion algorithm provides either no risk of adversarial behavior, a low risk of adversarial behavior, or a high risk of adversarial behavior.

TABLE B below includes a summary of the possible outcomes from the information fusion algorithm 70. The first, second and third columns of TABLE B are the same as the first, second and third columns from TABLE A. The fourth column is the result provided by the adversarial intent algorithm 56.

TABLE B

| Crossing Behavior | Non-Verbal Cue | Audible Cue | Adversarial Behavior? |
|---|---|---|---|
| No | No | No | No |
| No | No | Yes | Low |
| No | Yes | No | Low |
| No | Yes | Yes | Low |
| Yes | No | No | Low |
| Yes | No | Yes | Low |
| Yes | Yes | No | Low |
| Yes | Yes | Yes | High |

As shown, for the three-level indication of adversarial behavior, the adversarial intent algorithm 56 will indicate that there is no risk of adversarial behavior when none of the crossing behavior algorithm 60, the non-verbal cue algorithm 62, and the audible cues algorithm 64 indicate that there is adversarial behavior. The adversarial intent algorithm 56 will indicate that there is a low risk of adversarial behavior when any one or two of the crossing behavior algorithm 60, the non-verbal cue algorithm 62, and the audible cues algorithm 64 indicate that there is adversarial behavior. The adversarial intent algorithm 56 will indicate that there is a high risk of adversarial behavior when all three of the crossing behavior algorithm 60, the non-verbal cue algorithm 62, and the audible cues algorithm 64 indicate that there is adversarial behavior.

In another exemplary embodiment, when the pedestrian 52 is exhibiting adversarial behavior, a persistence algorithm 124 is adapted to classify the adversarial behavior as "no risk" when a duration of such adversarial behavior is less than a first pre-determined length of time, classify the adversarial behavior as "low risk" when the duration of such adversarial behavior is greater than the first pre-determined length of time and less than a second pre-determined length of time, and classify the adversarial behavior as "high risk" when the duration of such adversarial behavior is greater than the second pre-determined length of time.

Other approaches can be used to fuse the crossing behavior pattern, non-verbal cues and verbal cues such as using a weight scheme that combines the three indicators using weights that inversely proportional with the uncertainty of each indicator quantified by its variance or using Dempster's rule of combination that takes into consideration the degree of belief of each indicator.

In another exemplary embodiment, when the adversarial intent algorithm 56 determines that there is a risk of adversarial behavior, the vehicle controller 34 is further adapted to determine a risk level of the adversarial behavior based on opportunity and capability.

Opportunity can be a binary value that is represented by "yes" or a positive indication of the opportunity of adversarial behavior, or by a "no" or a negative indication of the opportunity of adversarial behavior. Positive opportunity represents an increased likelihood or risk of adversarial behavior. Negative opportunity represents a decreased likelihood or risk of adversarial behavior.

Similarly, capability can be a binary value that is represented by "yes" or a positive indication of the capability of adversarial behavior, or by a "no" or a negative indication of the capability of adversarial behavior. Positive capability represents an increased likelihood or risk of adversarial behavior. Negative capability represents a decreased likelihood or risk of adversarial behavior.

When determining a risk level of the adversarial behavior based on opportunity and capability, the vehicle controller 34 is further adapted to initiate an opportunity algorithm 300. The output of the opportunity algorithm 300 is either a determination of a positive opportunity of adversarial behavior, or a determination of a negative opportunity of adversarial behavior. In an exemplary embodiment, when initiating the opportunity algorithm 300, the vehicle controller 34 is further adapted to determine one of a positive opportunity of adversarial behavior and a negative opportunity of adversarial behavior based on a time of day, historical data related to how safe a location where the autonomous vehicle is located is, and how well the location where the autonomous vehicle is located is illuminated.

Figure 12:
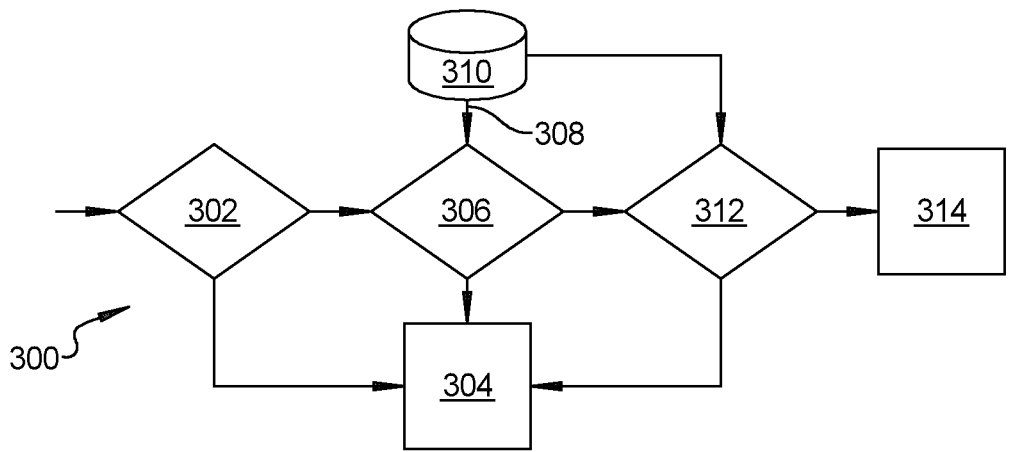
FIG. 12 is a schematic flow chart illustrating an opportunity algorithm.

Referring to FIG. 12, the opportunity algorithm 300 includes the steps of, beginning at block 302, determining if the time of day is "normal" or "irregular". Adversarial behavior is more likely at irregular times, for example, very late at night or very early in the morning. Thus, during irregular hours, the opportunity algorithm, moving to block 304, will output a positive opportunity of adversarial behavior.

During normal hours, for example, during normal business hours, adversarial behavior is less likely. Thus, during normal hours, the opportunity algorithm, moving from block 302 to 306, determining if the location where the autonomous vehicle 10 is located is inherently dangerous. As indicated by arrow 308, the opportunity algorithm 300, accesses historical data from a remotely located historical database 310. The remotely located historical database includes information collected related to how safe the location is, such as from police records, vehicle accident/damage reports, etc. If data received from the remotely located historical database 310 indicates that the area where the autonomous vehicle is located has a history of incidents, arrests, vehicle damage/accidents, crime, etc., then the opportunity algorithm, moving from block 306 to 304, will output a positive opportunity of adversarial behavior.

If, at block 306, data received from the remotely located historical database 310 indicates that the area where the autonomous vehicle 10 is located has little history of incidents, arrests, vehicle damage/accidents, crime, etc., then the opportunity algorithm 300, moving from block 306 to 312, will determine if the location where the autonomous vehicle 10 is located is well illuminated. The opportunity algorithm 300 will use information accessed from the remotely located historical database 310, as well as information gathered by external sensors 40a-40n on the autonomous vehicle 10 to determine if the area where the autonomous vehicle 10 is located is well illuminated. Adversarial behavior is more likely in areas that are dark or poorly illuminated, thus, if the opportunity algorithm 300, at block 312, determines that the area where the autonomous vehicle 10 is located is not well illuminated, then the opportunity algorithm 300, moving from block 312 to block 304, will output a positive opportunity of adversarial behavior. Correspondingly, if the opportunity algorithm, at block 312, determines that the area where the autonomous vehicle 10 is located is well illuminated, then the opportunity algorithm 300, moving to block 314, will output a negative opportunity of adversarial behavior.

In an exemplary embodiment, if the opportunity algorithm 300 indicates a negative opportunity of adversarial behavior, the vehicle controller 34 is further adapted to determine a low risk of adversarial behavior and to continue running the opportunity algorithm 300. If the opportunity algorithm 300 indicates a positive opportunity of adversarial behavior, the vehicle controller 14 is further adapted to initiate a capability algorithm 318 adapted to determine one of: a positive capability of adversarial behavior and a negative capability of adversarial behavior. When initiating the capability algorithm 318, the vehicle controller 34 is further adapted to initiate a threatening object detection algorithm 320.

Figure 13:
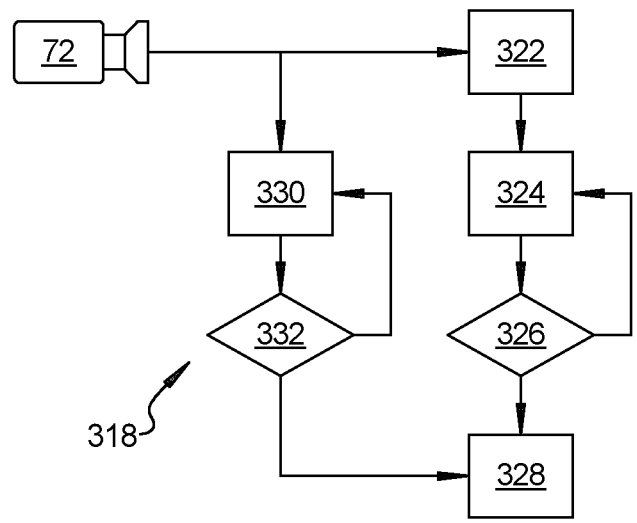
FIG. 13 is a schematic flow chart illustrating a capability algorithm.

Referring to FIG. 13, the capability algorithm 318 includes the steps of, beginning at block 322, collecting image information from the camera 72 of the pedestrian 52 and identifying and tracking body skeletal dynamics. Moving to block 324, the capability algorithm 318 then identifies overlapping skeletal features characterized as violence indicators. Moving to block 326, if the skeletal dynamics of the pedestrian 52 indicate violence, then, moving to block 328, the capability algorithm 318 will output a positive capability of adversarial behavior. If, at block 326, the skeletal dynamics of the pedestrian 52 do not indicate violence, then, moving back to block 324, the capability algorithm 318 continues to look for overlapping skeletal features characterized as violence indicators.

Further, the capability algorithm 318, at block 330, initiates a threatening object detection algorithm 320 that is adapted to identify threatening objects within the images captured by the camera 72. Moving to block 332, if the threatening object detection algorithm identifies threatening or dangerous objects (weapons, ball bat, knife, gun), then, moving to block 328, the capability algorithm 318 will output a positive capability of adversarial behavior. If, at block 332, no threatening objects are detected within the images from the camera 72, then, moving back to block 330, the threatening object detection algorithm 318 continues to analyze the images captured by the camera 72 to identify threatening objects. If the capability algorithm 318 indicates a negative capability of adversarial behavior, the vehicle controller 34 is further adapted to determine a low risk of adversarial behavior and to continue running the capability algorithm 318. If the opportunity algorithm 300 indicates a positive opportunity of adversarial behavior, and, if the capability algorithm 318 indicates a positive capability of adversarial behavior, the vehicle controller 34 is adapted to determine a high risk of adversarial behavior.

In another exemplary embodiment, the vehicle controller 34 is adapted to provide a three-level indication of adversarial behavior, wherein, based on the determination, by the adversarial intent algorithm 56, output from the opportunity algorithm 300, and output from the capability algorithm 318, the vehicle controller 34 is adapted to provide either no risk of adversarial behavior, a low risk of adversarial behavior, or a high risk of adversarial behavior.

TABLE C below includes a summary of the possible outcomes. The first column represents the indication, by the adversarial intent algorithm 56, of adversarial behavior. The second column represents the output from the opportunity algorithm 300. The third column represents the output from the capability algorithm 318. The fourth column represents the assigned level of risk of adversarial behavior, based on the input from columns one, two and three.

TABLE C

| Adversarial Intent | Opportunity | Capability | Risk Level |
| --- | --- | --- | --- |
| Yes | No | No | Low |
| Yes | No | Yes | Low |

TABLE C-continued

| Adversarial Intent | Opportunity | Capability | Risk Level |
|---|---|---|---|
| Yes | Yes | No | Low |
| Yes | Yes | Yes | High |

As shown, for the determination of the level of risk of adversarial behavior, when the adversarial intent algorithm 56 determines that there is adversarial behavior, the resulting risk level is characterized as a low risk of adversarial behavior, without regard for the output from the opportunity algorithm 300 and the capability algorithm 318. If only one of either the opportunity algorithm 300 or the capability algorithm 318 outputs a positive result, then the resulting risk level is characterized as a low risk of adversarial behavior. If both of the opportunity algorithm 300 and the capability algorithm 318 outputs a positive result, then the resulting risk level is characterized as a high risk of adversarial behavior.

In an exemplary embodiment, when the vehicle controller 34 determines a low risk of adversarial behavior, the vehicle controller 34 is further adapted to cause the autonomous vehicle 10 to generate visual and auditory warning cues for the pedestrian 52, and, when the vehicle controller 34 determines a high risk of adversarial behavior, the vehicle controller 34 is further adapted to generate reports with information related to the adversarial behavior and send the reports with information related to the adversarial behavior to remotely located entities, such as police, emergency services, etc.

Figure 9:
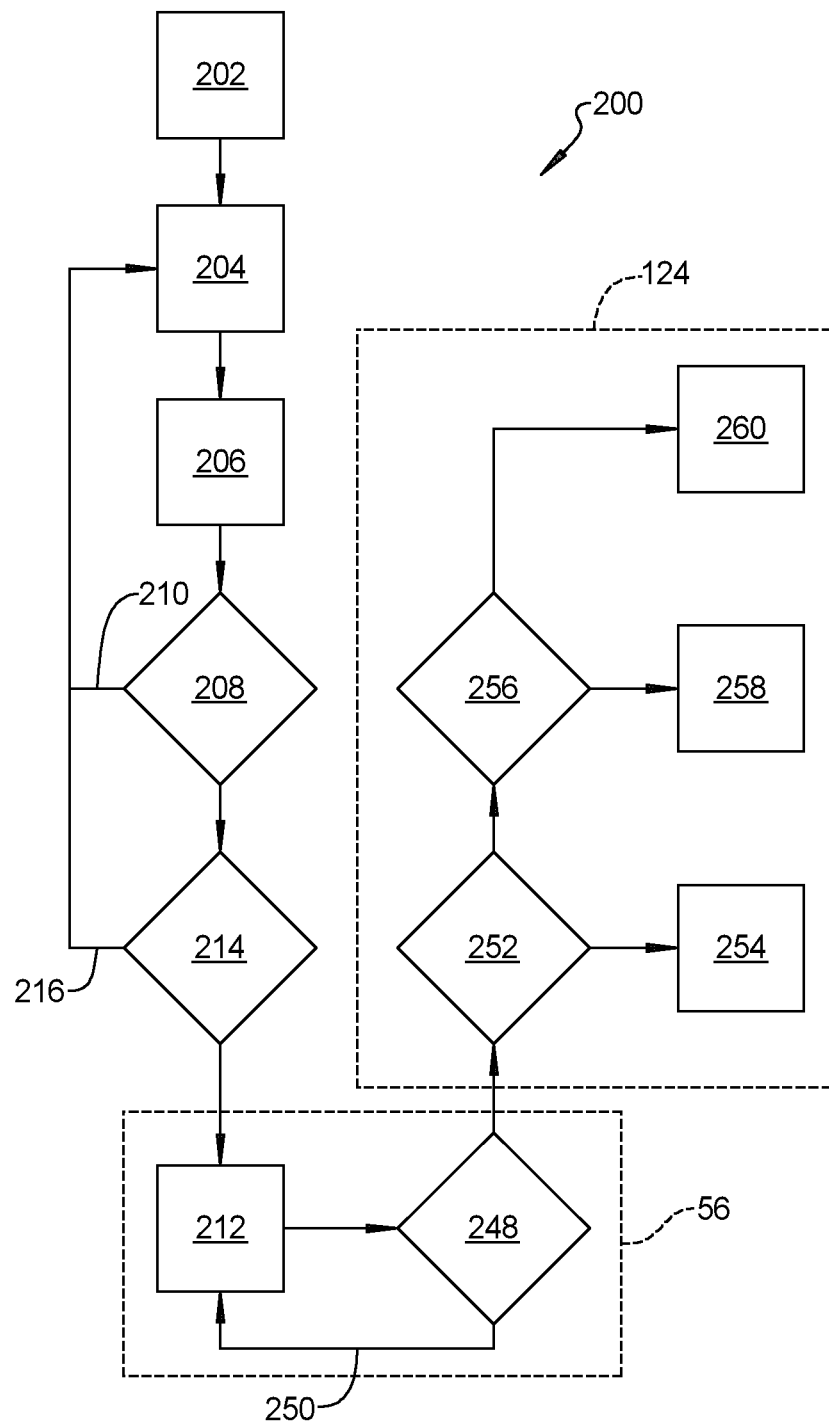
FIG. 9 is a flow chart illustrating a method according to an exemplary embodiment.

Referring to FIG. 9, a method 200 of identifying adversarial behavior directed to an autonomous vehicle 10 includes, starting at block 202, identifying, with a pedestrian detection system 50 in communication with a vehicle controller 34, a pedestrian 52 within proximity of the autonomous vehicle 10, moving to block 204, tracking the pedestrian 52 with the pedestrian tracking system 50, and moving to block 206, determining, with the pedestrian tracking system 50, if the pedestrian 52 is intending to cross in front of the autonomous vehicle 10.

Moving to block 208, if the pedestrian tracking system 50 determines that the pedestrian 52 is not intending to cross in front of the autonomous vehicle 10, then, moving back to block 204, as indicated by line 210, the method 200 includes continuing tracking of the pedestrian 52 with the pedestrian tracking system 50. If, at block 208, the pedestrian tracking system 50 determines that the pedestrian 52 is intending to cross in front of the autonomous vehicle 10, moving to block 212, the method 200 includes determining, with an adversarial intent algorithm 56, if the pedestrian 52 is exhibiting any adversarial behavior.

In an exemplary embodiment, if the pedestrian tracking system 50 determines that the pedestrian 52 is intending to cross in front of the autonomous vehicle 10, moving to block 214, the method 200 further includes determining, with the vehicle controller 34, if the autonomous vehicle 10 has right of way. If the autonomous vehicle 10 does not have the right of way, the method 200 further includes, moving back to block 204, as indicated by line 216, continuing tracking of the pedestrian 52 with the pedestrian tracking system 50. If, at block 214, the autonomous vehicle 10 does have the right of way, the method 200 further includes, moving to block 212, determining, with the adversarial intent algorithm 56, if the pedestrian 52 is exhibiting any adversarial behavior.

Figure 10:
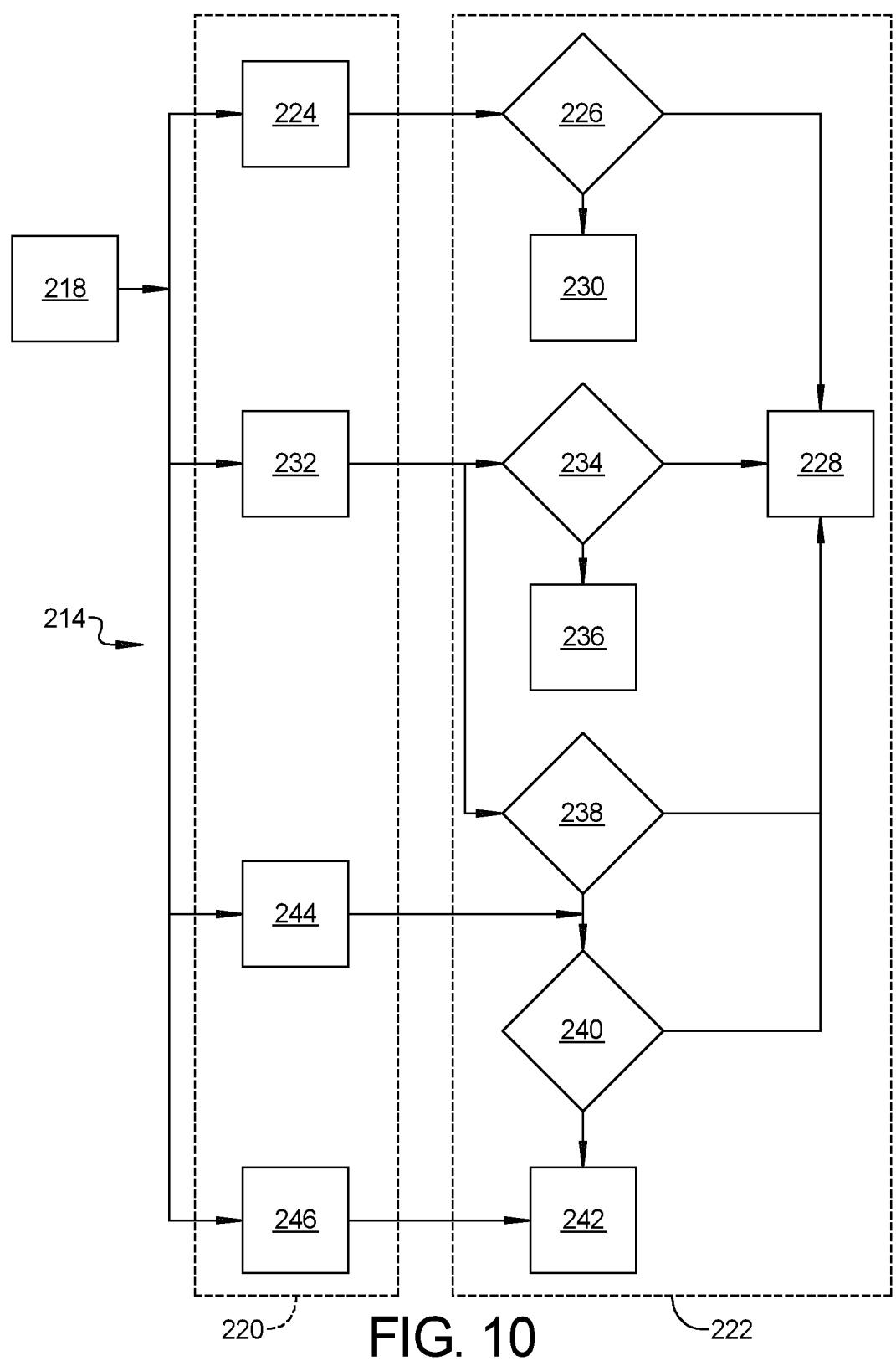
FIG. 10 is a flow chart illustrating a method of determining if the autonomous vehicle has the right of way at a cross walk.

Referring to FIG. 10, the determining, with the vehicle controller 34, if the autonomous vehicle 10 has a right of way at block 214 of FIG. 9, further includes, moving to block 218, determining, with the vehicle controller 34, what type of crossing is present in front of the autonomous vehicle 10, to be used by the pedestrian 52, moving to block 220, identifying, with the vehicle controller 34, crossing signals 58 for the identified crossing type, and, moving to block 222, determining, with the vehicle controller 34, if the autonomous vehicle 10 has the right of way based on the identified crossing signals 58.

Moving to block 224, if the vehicle controller 34 determines that the crossing signals 58 for the identified crossing type are signalized, then, moving to block 226, if the crossing signal 58 is flashing green, then, moving to block 228, the system 11 will determine that the autonomous vehicle 10 has the right of way. If, at block 226, if the vehicle controller 34 determines that the crossing signals 58 for the identified crossing type are not flashing green, then, moving to block 230, the system 11 will determine that the autonomous vehicle 10 does not have the right of way.

Moving to block 232, if the vehicle controller 34 determines that the crossing signals 58 for the identified crossing type are marked with red flashing beacons, then, moving to block 234 if the crossing signal 58 is flashing red beacons, then, moving to block 228, the system 11 will determine that the autonomous vehicle 10 has the right of way. If, at block 234, the vehicle controller 34 determines that the crossing signals 58 for the identified crossing type are not flashing red beacons, then, moving to block 236, the system 11 will determine that the autonomous vehicle 10 does not have the right of way. Moving again to block 232, if the vehicle controller 34 determines that the crossing signals 58 for the identified crossing type are marked with a yield sign, then, moving to block 238 if the pedestrian 52 must yield, then, moving to block 228, the system 11 will determine that the autonomous vehicle 10 has the right of way. If, at block 238, the pedestrian 52 does not yield, then, moving to block 240, if the pedestrian crosses within a predetermined window of time, then, moving to block 228, the system 11 will determine that the autonomous vehicle 10 has the right of way. If, at block 240, the pedestrian does not cross within the predetermined window of time, then, moving to block 242, the system 11 will determine that the autonomous vehicle 10 does not have the right of way.

Moving to block 244, if the vehicle controller 34 determines that the crossing type is un-marked, then, moving to block 240, if the pedestrian crosses within a predetermined window of time, then, moving to block 228, the system 11 will determine that the autonomous vehicle 10 has the right of way. If, at block 240, the pedestrian does not cross within the predetermined window of time, then, moving to block 242, the system 11 will determine that the autonomous vehicle 10 does not have the right of way.

Moving to block 246, in situations where the cross-walk 54 is a school crossing, or a crossing that is controlled by an authorized patrolman, policeman, construction worker or traffic warden, then, moving to block 242, the system 11 will determine that the autonomous vehicle 10 does not have the right of way, and further that there is no adversarial behavior.

Referring again to FIG. 9, the determining, with the adversarial intent algorithm 56, if the pedestrian 52 is exhibiting any adversarial behavior at block 212 further includes determining, with the adversarial intent algorithm 56, if the pedestrian 52 is exhibiting any adversarial behavior based on at least one of crossing behavior of the pedestrian, non-verbal cues from the pedestrian and audible cues.

In an exemplary embodiment, the determining, with the adversarial intent algorithm 56, if the pedestrian 52 is exhibiting any adversarial behavior based on the crossing behavior of the pedestrian 52, using a crossing behavior algorithm, further includes calculating, with the vehicle controller 34, an estimated crossing time for the pedestrian 52 to cross in front of the autonomous vehicle 10, determining, with the adversarial intent algorithm 56, that the pedestrian 52 is not exhibiting any adversarial behavior when the pedestrian 52 finishes crossing in front of the autonomous vehicle 10 within a predetermined time window, and determining, with the adversarial intent algorithm 56, that the pedestrian is exhibiting adversarial behavior when the pedestrian 52 does not finish crossing in front of the autonomous vehicle 10 within the predetermined time window.

Figure 5:
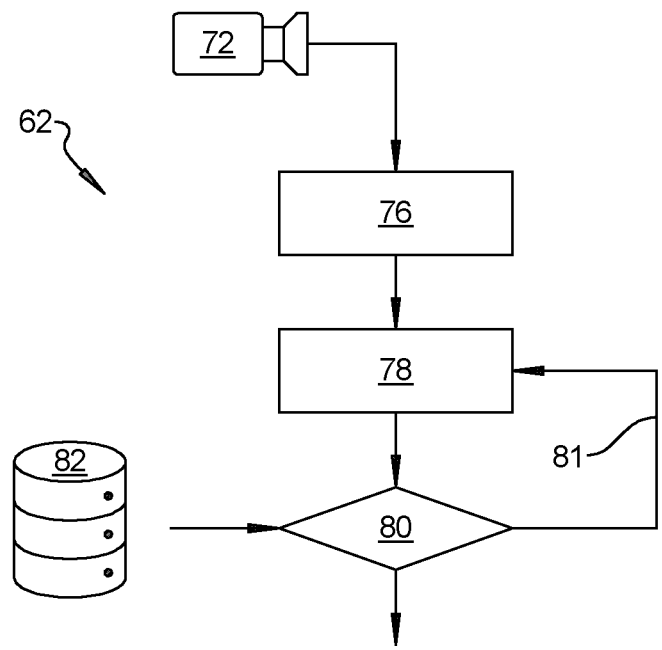
FIG. 5 is schematic view of a non-verbal cue algorithm according to an exemplary embodiment.

In another exemplary embodiment, the determining, with the adversarial intent algorithm 56, if the pedestrian 52 is exhibiting any adversarial behavior based on non-verbal cues from the pedestrian 52, using a non-verbal cue algorithm at block 212, further includes, as shown in FIG. 5, at block 76, identifying, with the pedestrian tracking system 50, physical properties of the pedestrian 52, and, moving to block 78, analyzing, with the vehicle controller 34, spatiotemporal characteristics of the physical properties of the pedestrian 52, and determining, with the vehicle controller 34, if any physical properties of the pedestrian 52 indicate adversarial behavior by the pedestrian 52.

In another exemplary embodiment, the analyzing, with the vehicle controller 34, spatiotemporal characteristics of the physical properties of the pedestrian 52, at block 78 of FIG. 5, further includes, referring to FIG. 7 and moving to block 88, identifying, with the pedestrian tracking system 50, key points of a hand 86 of the pedestrian 52, moving to block 90, comparing, with the vehicle controller 34, identified key points 84 of the hand 86 of the pedestrian 52 to a remote database 92 of known threatening gestures, and, moving to block 94, determining, with the adversarial intent algorithm 56, that the pedestrian 52 is exhibiting adversarial behavior when the identified key points 84 of the hand 86 of the pedestrian 52 match at least one of the known threatening gestures within the remote database 92.

In another exemplary embodiment, the determining, with the adversarial intent algorithm 56, if the pedestrian 52 is exhibiting any adversarial behavior based on audible cues, using an audible cue algorithm 64, further includes, referring to FIG. 8, capturing, with an external microphone 100, acoustic signals, moving to block 120, extracting, with the vehicle controller 34, features of the acoustic signals, and, moving to block 104, comparing, with the vehicle controller 34, features of the acoustic signals to a remote database 102 which includes an optimized model of known sounds that indicate adversarial behavior, and, moving to block 212 in FIG. 9, determining, with the adversarial intent algorithm 56, that the pedestrian 52 is exhibiting adversarial behavior when the captured acoustic signals match known sounds that indicate adversarial behavior.

In yet another exemplary embodiment, the determining, with the adversarial intent algorithm 56, if the pedestrian 52 is exhibiting any adversarial behavior based on at least one of crossing behavior of the pedestrian, non-verbal cues from the pedestrian and audible cues, at block 212, further includes using an information fusion algorithm 70 within the adversarial intent algorithm 56 and the vehicle controller 34 to combine information related to the crossing behavior of the pedestrian 52, information related to non-verbal cues from the pedestrian 52 and audible cues to identify adversarial behavior.

Referring again to FIG. 9, in an exemplary embodiment the information fusion algorithm 70 is adapted to provide a two-level indication of adversarial behavior, wherein, based on the output from the crossing behavior algorithm 60, the non-verbal cue algorithm 62, and the audible cues algorithm 64, the information fusion algorithm provides a binary answer, in that, there either is adversarial behavior on the part of the pedestrian 52, or there is not adversarial behavior on the part of the pedestrian 52.

Moving to block 248, if the adversarial intent algorithm 56, at block 212, determines that there is no adversarial behavior, then, moving back to block 212, as indicated by line 250, the adversarial intent algorithm continues to look for adversarial behavior. If the adversarial intent algorithm 56 determines that the pedestrian 52 is exhibiting adversarial behavior, the system 11 initiates a persistence algorithm 124. Moving to block 252, when a duration of such adversarial behavior is less than a first pre-determined length of time, moving to block 254, the system 11 is adapted to classify the adversarial behavior as "no risk". Moving back to block 252, when a duration of such adversarial behavior is more than the first pre-determined length of time, and, moving to block 256, less than a second predetermined length of time, moving to block 258, the system 11 is adapted to classify the adversarial behavior as "low risk". Moving back to block 256, when a duration of such adversarial behavior is more than the second pre-determined length of time, moving to block 260, the system 11 is adapted to classify the adversarial behavior as "high risk".

Figure 11:
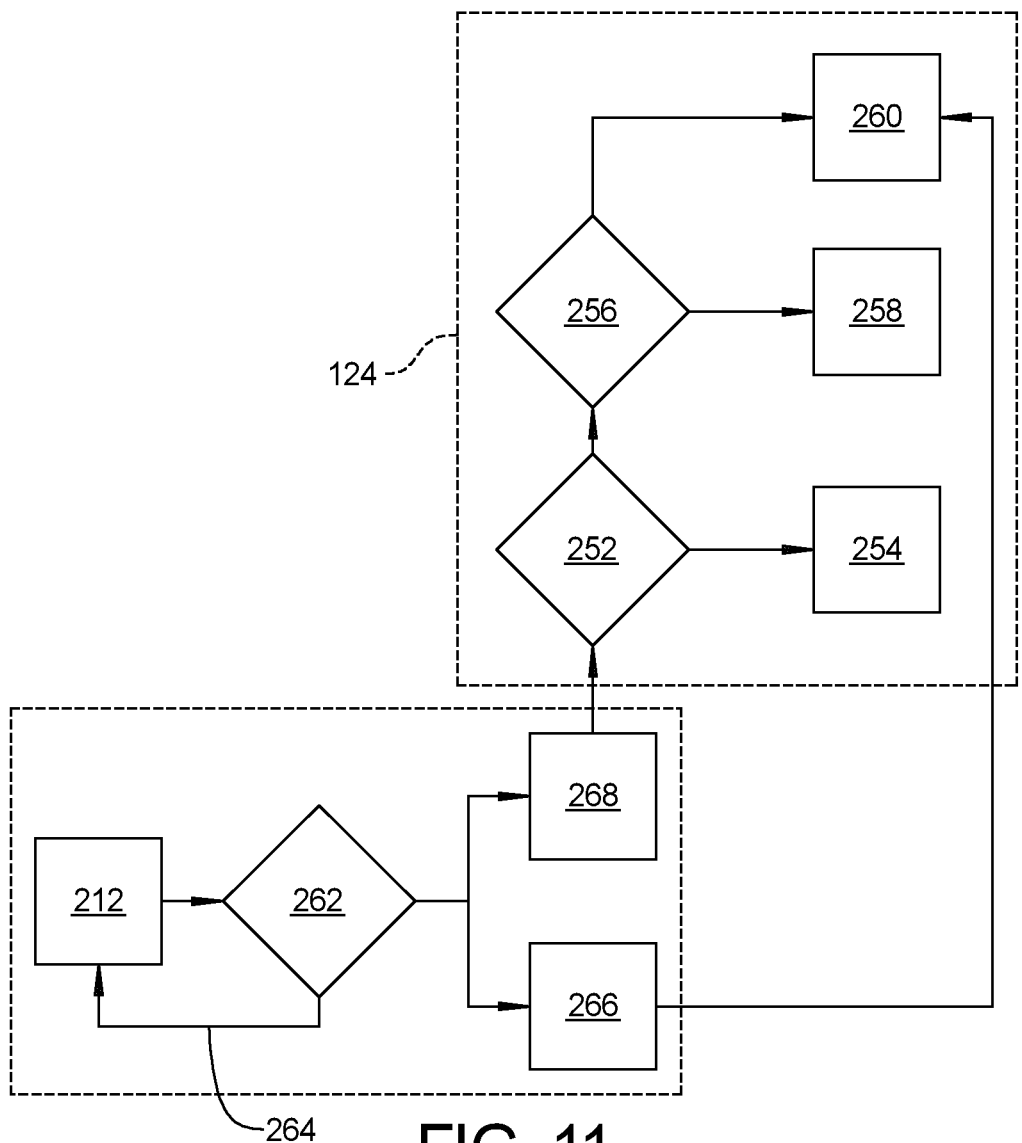
FIG. 11 is a flow chart illustrating an alternate embodiment of the method shown in FIG. 9.

Referring to FIG. 11, in another exemplary embodiment, the information fusion algorithm 70 is adapted to provide, at block 262, a three-level indication of adversarial behavior, wherein, based on the output from the crossing behavior algorithm 60, the non-verbal cue algorithm 62, and the audible cues algorithm 64, the information fusion algorithm 70 provides either no risk of adversarial behavior, a low risk of adversarial behavior, or a high risk of adversarial behavior. Moving to block 262, if the adversarial intent algorithm 56, at block 212, determines that there is no adversarial behavior, then, moving back to block 212, as indicated by line 264, the adversarial intent algorithm continues to look for adversarial behavior. If the adversarial intent algorithm 56, at block 262, determines that there is a high risk of adversarial behavior, moving to block 266, the system 11 determines that there is a high risk of adversarial behavior at block 260. If the adversarial intent algorithm 56, at block 262, determines, moving to block 268, that there is a low risk of adversarial behavior, then the system 11 initiates the persistence algorithm 124.

Moving to block 252, when a duration of such adversarial behavior is less than a first pre-determined length of time, moving to block 254, the system 11 is adapted to classify the adversarial behavior as "no risk". Moving back to block 252, when a duration of such adversarial behavior is more than the first pre-determined length of time, and, moving to block 256, less than a second predetermined length of time, moving to block 258, the system 11 is adapted to classify the adversarial behavior as "low risk". Moving back to block 256, when a duration of such adversarial behavior is more than the second pre-determined length of time, moving to block 260, the system 11 is adapted to classify the adversarial behavior as "high risk".

Figure 14:
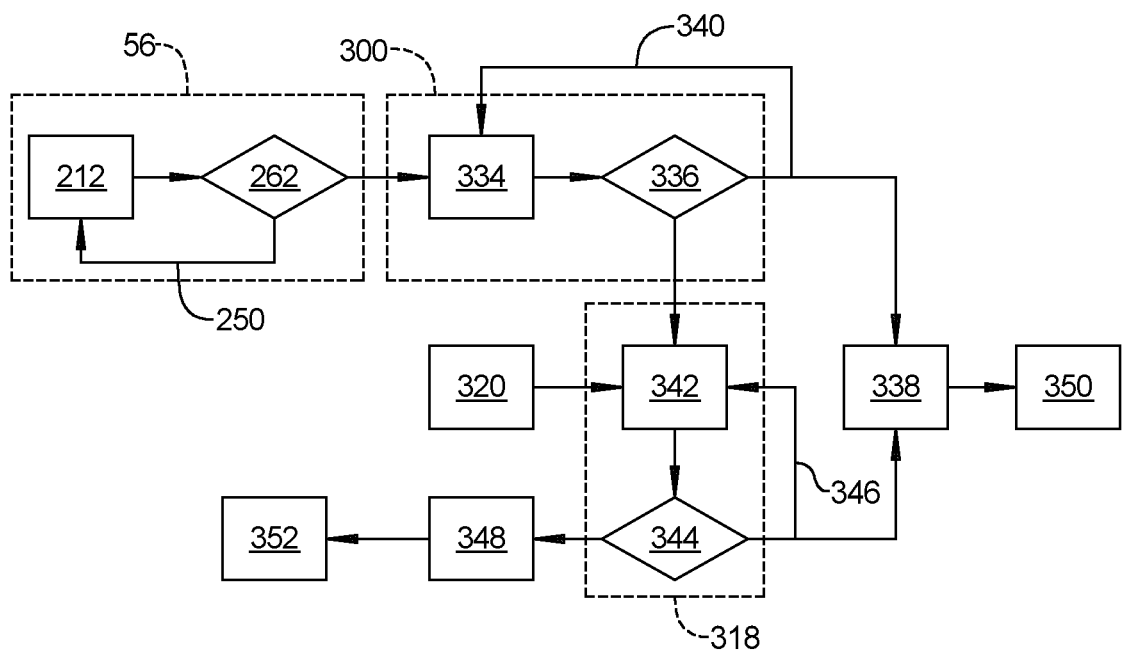
FIG. 14 is a schematic flow chart illustrating an alternative embodiment of the method shown in FIG. 9, including determination of opportunity and capability of adversarial behavior.

In another exemplary embodiment, when the adversarial intent algorithm 56 determines that there is a risk of adversarial behavior, the method includes determining a risk level of the adversarial behavior based on opportunity and capability. Referring to FIG. 14, when the adversarial intent algorithm 56 determines that there is adversarial behavior, moving to block 334, the method includes initiating, with the vehicle controller 34, an opportunity algorithm 300 adapted to determine one of: a positive opportunity of adversarial behavior and a negative opportunity of adversarial behavior. Moving to block 336, if the opportunity algorithm 300 indicates a negative opportunity of adversarial behavior, then, moving to block 338, the method includes determining, with the vehicle controller 34, a low risk of adversarial behavior and, moving back to block 334, as indicated by line 340, continuing to run, with the vehicle controller 34, the opportunity algorithm 300.

If the opportunity algorithm indicates a positive opportunity of adversarial behavior at block 336, then, moving to block 342, the method includes initiating, with the vehicle controller 34, a capability algorithm 318 adapted to determine one of: a positive capability of adversarial behavior and a negative capability of adversarial behavior. In an exemplary embodiment, the initiating, with the vehicle controller 34, the capability algorithm 318, at block 342, further includes, initiating a threatening object detection algorithm 320.

Moving to block 344, if the capability algorithm 318 indicates a negative capability of adversarial behavior, moving to block 338, the method includes determining, with the vehicle controller 34, a low risk of adversarial behavior, and, moving back to block 342, as indicated by line 346, continuing to run, with the vehicle controller 34, the capability algorithm 318. If, at block 336, the opportunity algorithm 300 indicates a positive opportunity of adversarial behavior, and, if, at block 344, the capability algorithm 318 indicates a positive capability of adversarial behavior, the method includes, moving to block 348, determining, with the vehicle controller 34, a high risk of adversarial behavior.

In an exemplary embodiment, the determining, with the vehicle controller 34, a low risk of adversarial behavior, at block 338, further includes, moving to block 350, generating, with the vehicle controller 34, visual and auditory warning cues for the pedestrian 52, and, the determining, with the vehicle controller 34, a high risk of adversarial behavior, at block 348, further includes, moving to block 352, generating, with the vehicle controller 34, reports with information related to the adversarial behavior and sending reports with information related to the adversarial behavior to remotely located entities 48.

A system and method of the present disclosure offers the advantage of automatically detecting adversarial behavior directed toward an autonomous vehicle, as well as providing an assessment of the level of risk based on opportunity and capability of adversarial behavior.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of determining opportunity and capability for identified adversarial behavior within an autonomous vehicle, comprising:
    determining, with a pedestrian detection system, a vehicle controller and an adversarial intent algorithm, a risk level of adversarial behavior from at least one pedestrian within proximity of the autonomous vehicle based on contextual information including at least one of: a time of day, historical data related to how safe a location where the autonomous vehicle is located is, how crowded a cross-walk is, weather conditions and how well the location where the autonomous vehicle is located is illuminated;
    when the adversarial intent algorithm determines that there is a risk of adversarial behavior, determining the risk level of the adversarial behavior based on opportunity and capability; and
    generating visual and auditory warning cues for the at least one pedestrian, generating reports with information related to the adversarial behavior and sending the reports with the information related to the adversarial behavior to remotely located police and emergency service providers, based on the risk level of the adversarial behavior.

2. The method of claim 1, wherein the determining a risk level of the adversarial behavior based on opportunity and capability includes initiating, with the vehicle controller, an opportunity algorithm adapted to determine one of: a positive opportunity of adversarial behavior and a negative opportunity of adversarial behavior.

3. The method of claim 2, wherein the initiating, with the vehicle controller, the opportunity algorithm includes determining one of the positive opportunity of adversarial behavior and the negative opportunity of adversarial behavior based on the contextual information.

4. The method of claim 2, wherein, if the opportunity algorithm indicates a negative opportunity of adversarial behavior, the method includes determining, with the vehicle controller, a low risk of adversarial behavior and continuing to run, with the vehicle controller, the opportunity algorithm.

5. The method of claim 4, wherein, if the opportunity algorithm indicates a positive opportunity of adversarial behavior, the method includes initiating, with the vehicle controller, a capability algorithm adapted to determine one of: a positive capability of adversarial behavior and a negative capability of adversarial behavior.

6. The method of claim 5, wherein, the initiating, with the vehicle controller, the capability algorithm further includes initiating a threatening object detection algorithm.

7. The method of claim 6, wherein, if the capability algorithm indicates a negative capability of adversarial behavior, the method includes determining, with the vehicle controller, a low risk of adversarial behavior and continuing to run, with the vehicle controller, the capability algorithm.

8. The method of claim 7, wherein, if the opportunity algorithm indicates a positive opportunity of adversarial behavior, and, if the capability algorithm indicates a positive capability of adversarial behavior, the method includes determining, with the vehicle controller, a high risk of adversarial behavior.

9. The method of claim 8, wherein, the determining, with the vehicle controller, a low risk of adversarial behavior further includes generating, with the vehicle controller, the visual and auditory warning cues for the pedestrian.

10. The method of claim 9, wherein, the determining, with the vehicle controller, a high risk of adversarial behavior further includes the generating, with the vehicle controller, reports with information related to the adversarial behavior and sending the reports with the information related to the adversarial behavior to remotely located entities.

11. A system for determining opportunity and capability for identified adversarial behavior within an autonomous vehicle, comprising a pedestrian detection system, a vehicle controller and an adversarial intent algorithm adapted to determine a risk level of adversarial behavior from at least one pedestrian within proximity of the autonomous vehicle based on contextual information including at least one of: a time of day, historical data related to how safe a location where the autonomous vehicle is located is, how crowded a cross-walk is, weather conditions and how well the location where the autonomous vehicle is located is illuminated, and, when the adversarial intent algorithm determines that there is a risk of adversarial behavior, to determine the risk level of the adversarial behavior based on opportunity and capability, and generate visual and auditory warning cues for the at least one pedestrian, generate reports with information related to the adversarial behavior and send the reports with the information related to the adversarial behavior to remotely located police and emergency service providers, based on the risk level of the adversarial behavior.

12. The system of claim 11, wherein when determining a risk level of the adversarial behavior based on opportunity and capability, the vehicle controller is further adapted to initiate an opportunity algorithm adapted to determine one of: a positive opportunity of adversarial behavior and a negative opportunity of adversarial behavior.

13. The system of claim 12, wherein when initiating the opportunity algorithm, the vehicle controller is further adapted to determine one of the positive opportunity of adversarial behavior and the negative opportunity of adversarial behavior based on a time of day, historical data related to how safe a location where the autonomous vehicle is located is, and how well the location where the autonomous vehicle is located is illuminated.

14. The system of claim 12, wherein, if the opportunity algorithm indicates a negative opportunity of adversarial behavior, the vehicle controller is further adapted to determine a low risk of adversarial behavior and to continue running the opportunity algorithm.

15. The system of claim 14, wherein, if the opportunity algorithm indicates a positive opportunity of adversarial behavior, the vehicle controller is further adapted to initiate a capability algorithm adapted to determine one of: a positive capability of adversarial behavior and a negative capability of adversarial behavior.

16. The system of claim 15, wherein, when initiating the capability algorithm, the vehicle controller is further adapted to initiate a threatening object detection algorithm.

17. The system of claim 16, wherein, if the capability algorithm indicates a negative capability of adversarial behavior, the vehicle controller is further adapted to determine a low risk of adversarial behavior and to continue running the capability algorithm.

18. The system of claim 17, wherein, if the opportunity algorithm indicates a positive opportunity of adversarial behavior, and, if the capability algorithm indicates a positive capability of adversarial behavior, the vehicle controller is adapted to determine a high risk of adversarial behavior.

19. The system of claim 18, wherein, when the vehicle controller determines a low risk of adversarial behavior, the vehicle controller is further adapted to cause the autonomous vehicle to generate visual and auditory warning cues for the pedestrian, and, when the vehicle controller determines a high risk of adversarial behavior, the vehicle controller is further adapted to generate reports with information related to the adversarial behavior and send the reports with the information related to the adversarial behavior to remotely located entities.

20. A system for determining opportunity and capability for identified adversarial behavior within an autonomous vehicle, comprising a pedestrian detection system, a vehicle controller and an adversarial intent algorithm adapted to determine a risk level of adversarial behavior from at least one pedestrian within proximity of the autonomous vehicle, and, when the adversarial intent algorithm determines that there is a risk of adversarial behavior, to determine the risk level of the adversarial behavior based on opportunity and capability, wherein;
   when initiating the opportunity algorithm, the vehicle controller is further adapted to determine one of a positive opportunity of adversarial behavior and a negative opportunity of adversarial behavior based on a time of day, historical data related to how safe a location where the autonomous vehicle is located is, and how well the location where the autonomous vehicle is located is illuminated;
   if the opportunity algorithm indicates a negative opportunity of adversarial behavior, the vehicle controller is further adapted to determine a low risk of adversarial behavior and to continue running the opportunity algorithm;
   if the opportunity algorithm indicates a positive opportunity of adversarial behavior, the vehicle controller is further adapted to initiate a capability algorithm adapted to determine one of: the positive capability of adversarial behavior and the negative capability of adversarial behavior;
   if the capability algorithm indicates a negative capability of adversarial behavior, the vehicle controller is further adapted to determine a low risk of adversarial behavior and to continue running the capability algorithm;
   if the opportunity algorithm indicates a positive opportunity of adversarial behavior, and, if the capability algorithm indicates a positive capability of adversarial behavior, the vehicle controller is adapted to determine a high risk of adversarial behavior; and
   when the vehicle controller determines a low risk of adversarial behavior, the vehicle controller is further adapted to cause the autonomous vehicle to generate visual and auditory warning cues for the pedestrian, and, when the vehicle controller determines a high risk of adversarial behavior, the vehicle controller is further adapted to generate reports with information related to the adversarial behavior and send the reports with the information related to the adversarial behavior to remotely located entities.

* * * * *